April 5, 1955
W. L. McCLURE
2,705,664
ELEVATION OF GRANULAR SOLIDS
Filed June 19, 1951
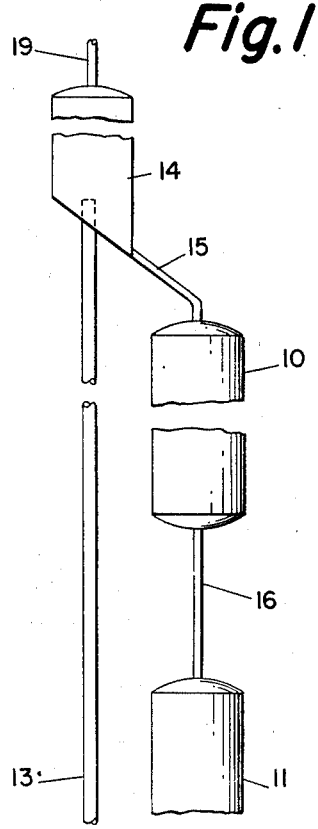
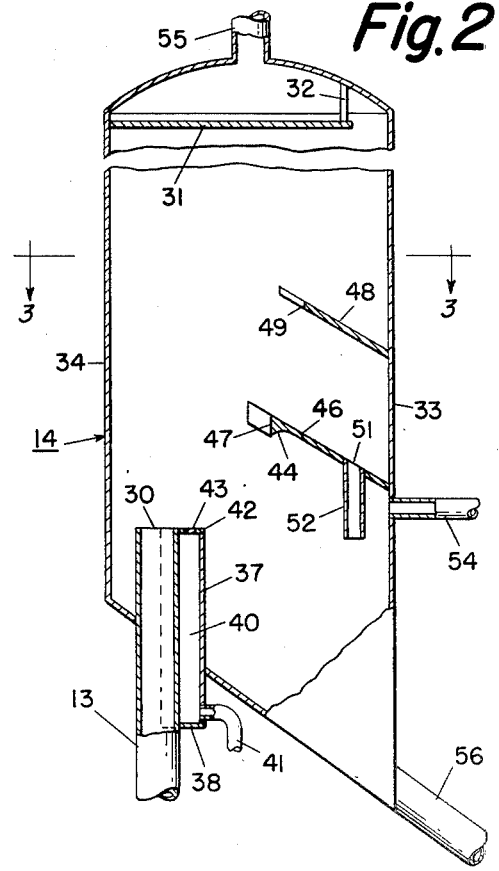
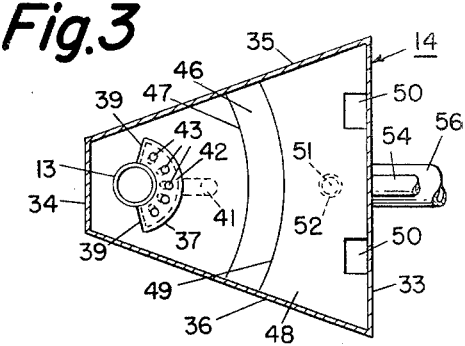
INVENTOR.
WILLIAM L. McCLURE
By Busser and Harding
ATTORNEYS

United States Patent Office 2,705,664
Patented Apr. 5, 1955

2,705,664

ELEVATION OF GRANULAR SOLIDS

William L. McClure, Toledo, Ohio, assignor to Sun Oil Company, Philadelphia, Pa., a corporation of New Jersey Application June 19, 1951, Serial No. 232,281

2 Claims. (Cl. 302—59)

This invention relates to the elevation of granular solids by means of a lifting gas and more particularly to the separation of solids from gas after such elevation.

It is known in the art to elevate granular solids from a lower zone to a higher zone by suspending the solids in a lifting gas under pressure and passing the lifting gas, having solids suspended therein, upwardly through an elongated confined zone into an expansion zone constituting the higher zone. After such elevation it is customary to separate solids from gas by passing the solids and gas upwardly through the expansion zone as a rising stream. As the gas and solids rise the gas expands laterally and consequently decreases in velocity. The solids correspondingly decrease in velocity until their upward velocity is zero and then the solids fall back into a lower portion of the expansion zone where they are collected for further use.

An important industrial application of gas lifting operations as above described, is in the so-called moving bed continuous process for the conversion of hydrocarbon materials by contact with conversion supporting granular solids. In such processes it is customary to gravitate granular solids as a compact mass through a reaction zone or zones and thence to a low level in the system of apparatus. At the lower level the solids are suspended in the lifting gas and elevated through an elongated lift conduit to a level above the reaction zone. The solids and gas are discharged from the lift conduit upwardly into an expansion zone known as the disengager. The solids after decreasing in upward velocity to zero, fall downwardly into the bottom of the disengager and are removed therefrom to gravitate again through the reaction zone. Lifting gas is generally removed from the disengager separately from the main bulk of the granular solids and is conveyed to separating means such as a cyclone separator for removing small quantities of fine granular solids which have become entrained in the lifting gas.

In gas lifting operations as previously described, including operations as employed in hydrocarbon conversion processes and also in other industrial applications, the granular solids which are elevated are subject to substantial attrition under circumstances which are ordinarily encountered in gas lift operations as previously practiced. For example, when granular solids are elevated through elongated confined zones it is necessary to impart to the solids a high degree of linear velocity. As a result, when the solids are discharged from the lift conduit into the expansion zone they tend to move substantially vertically upward with only a slight degree of lateral movement. After the solids reverse direction they accordingly have a disadvantageous tendency to fall directly backward onto the solids rising from beneath. This causes substantial turbulence in the disengager and the effect of the falling solids striking the rising solids is to obtain a disadvantageously high degree of attrition. In gas lifting operations as previously practiced, the lifting gas after discharge from the lift conduit expands and moves laterally more rapidly than do the solids. Nevertheless, in prior processes the expansion and lateral movement of the lifting gas has not been rapid enough to provide an operation wherein the granular solids will move laterally under the influence of the laterally moving lifting gas, to a sufficient degree to prevent the disadvantageous effect as previously described.

According to the present invention, an operation is achieved whereby the solids and gas discharged from a lift conduit outlet into a disengager move laterally rapidly enough and to a sufficient degree that the solids do not fall backwardly directly into the solids rising from beneath. This advantageous effect is obtained by discharging into the disengager, in addition to the main stream of gas and solids, an auxiliary gas stream having a high velocity. The auxiliary gas stream is discharged upwardly from a point adjacent but outside of the rising stream of gas and solids. The auxiliary gas stream rises a substantial distance through the disengager and during this rise gaseous communication is provided between the rising stream of lifting gas and solids and the auxiliary gas stream which is traveling at a velocity substantially higher than the velocity of the rising stream. By virtue of its high velocity the auxiliary gas stream tends to create a vacuum adjacent to that portion of the disengager through which it travels. The gas adjacent to that portion of the disengager tends to move toward the auxiliary gas stream in order to satisfy the vacuum. Therefore in the zone of gaseous communication between the auxiliary gas stream and the stream of lifting gas and solids, the motion of gas is toward the auxiliary gas stream with the result that the lifting gas as it rises moves laterally toward the auxiliary gas stream more rapidly than it would in the absence of such auxiliary gas stream. The more rapid lateral movement of the lifting gas causes the rising solids to move laterally to a greater degree than they would in the absence of the auxiliary gas. Therefore, the solids are inhibited or prevented from falling directly downwardly onto the solids rising from beneath and instead when they fall downwardly it is through a region laterally disposed relative to the rising solids stream.

The auxiliary gas stream should be an inclined stream directed upwardly from a point adjacent to the rising stream and directed away from the rising stream. The angle at which the stream is directed is such that through a substantial distance of rise of the auxiliary gas stream the latter stream is close enough to the rising stream to exert a substantial effect thereon as previously described. The auxiliary gas after passing through such substantial distance of rise is removed from the disengager substantially separately from lifting gas. This type of operation can be achieved, for example, in the manner as subsequently described in connection with the drawing and is advantageous in that it tends to minimize turbulence in the disengager.

The invention will be further described with reference to the attached drawing: Figure 1 is a schematic diagram of a system of apparatus which is adapted for the circulation of granular solids therethrough with means for elevating granular solids by means of a lifting gas from a low level in the system to a high level therein. Figure 2 is a sectional elevational view of a disengager adapted for use in connection with the gas lifting operation contemplated in the operation of the apparatus shown in Figure 1. Figure 3 is a sectional plan view of such a disengager. Figures 2 and 3 show details of apparatus according to the present invention whereas Figure 1 does not illustrate any such details and is presented merely for the purpose of showing a general type of apparatus to which the present invention can be applied.

Turning now to Figure 1, there are shown therein reaction vessels 10 and 11, gas lift engaging vessel 12, lift conduit 13, and gas lift disengaging vessel 14. In operation granular solids are gravitated from the bottom of disengager 14 through line 15 into reaction vessel 10 which may be, for example, a hydrocarbon conversion vessel. From vessel 10 the solids gravitate through line 16 into reaction vessel 11, which may be, for example, a regenerator for hydrocarbon conversion-supporting granular solids. From vessel 11 the solids gravitate through line 17 into engager 12 wherein they are suspended in lifting gas introduced into engager 12 through line 18. The lifting gas having solids suspended therein, is passed upwardly through lift conduit 13 into disengager 14. The solids and gas pass upwardly in disengager 14 as a rising stream. The solids fall backwardly toward the bottom of disengager 14 and the lifting gas is removed through line 19 for passage to separating means such as a cyclone separator not shown. According to the present invention auxiliary gas is introduced into disengager 14 through means which are not illustrated in Figure 1 but which are shown in Figures 2 and 3.

Turning now to Figures 2 and 3, there is shown therein a disengaging vessel 14 above and communicating with the outlet 30 of lift conduit 13. Disengager 14 provides therein a space directly above the lift conduit outlet. This space is bounded at the top thereof by baffle plate 31 which is supported in the disengager by means of support rod 32. Disengager 14 provides, between the space directly above the lift conduit outlet and the side wall 33 of disengager 14, an expansion space for substantial lateral expansion of lifting gas. Outlet 30 of lift conduit 13 being adjacent to side wall 34 of disengager 14 and also to side walls 35 and 36 of disengager 14, no space for substantial lateral expansion toward those side walls is provided. Around an upper portion of lift conduit 13 is a sleeve 37 having its lower end positioned exteriorly of disengager 14 and having its upper end on the same vertical level as outlet 30 of lift conduit 13. Sleeve 37 extends around that portion of lift conduit 13 which faces toward side wall 33 of disengager 14. A plate 38 closes off the bottom of the sleeve 37, and a plate 42 closes off the top of sleeve 37. Plates 39 close off the sides of the sleeve 37 in order to provide an auxiliary gas conduit 40 extending from a point outside disengager 14 upwardly to the level of the lift conduit outlet 30. A conduit 41 communicates with the lower portion of the auxiliary gas conduit 40 and constitutes an exterior extension of the conduit 40. Top plate 42 has a plurality of inclined apertures 43 therethrough providing inclined upwardly directed outlets from auxiliary gas conduit 40.

Secured to the side wall 33 of disengager 14 is a transverse baffle 46 which is downwardly inclined toward the side wall 33. The outlets provided by apertures 43 are directed toward the under surface of baffle 46, which has a turned down portion 44 at its inner edge to aid in directing auxiliary gas toward side wall 33. The inner surface 47 of baffle 46 is positioned outside the space directly above the lift conduit outlet and within the expansion space which is laterally disposed with regard to the space directly above the lift conduit outlet. Spaced vertically above the baffle 46 is a second transverse baffle 48 which is also downwardly inclined toward side wall 33 and secured to that side wall. The inner surface 49 of the baffle 48 is also positioned within the expansion space and outside the space directly above the lift conduit outlet. Baffle 48 has apertures 50 therein providing means for removing granular solids from above the baffle 48. Baffle 46 has an aperture 51 therein and extending downwardly from said aperture is a conduit 52 providing means for removing granular solids from above the baffle 46. Beneath baffle 46 is an auxiliary gas removal conduit 54. Disengager 14 also has an outlet 55 for removal of lifting gas from the top of disengager 14 and has a solids outlet 56 from the bottom of the disengager.

In operation granular solids and lifting gas are discharged upwardly from lift conduit outlet 30 into disengager 14. The solids and gas rise through disengager 14 through the space directly above the lift conduit outlet and toward the baffle plate 31. At the same time auxiliary gas is introduced through conduit 41 into the annular conduit 40 between sleeve 37 and lift conduit 13. The auxiliary gas passes through conduit 40 and is discharged upwardly from the outlets 43 of the annular conduit 40 as inclined streams directed toward the under surface of baffle 46. As the auxiliary gas rises through the space beneath the baffle 46 it tends by virtue of its velocity, which is higher than the velocity of the lifting gas discharged from lift conduit outlet 30, to create a vacuum in the gaseous communication zone between the rising stream of gas and solids and the auxiliary gas stream. The lifting gas moves laterally toward and through the zone of gaseous communication in order to satisfy the vacuum. This movement of the lifting gas causes the solids to be displaced laterally as they rise toward side wall 33 of disengager 14. As the solids rise their upward velocity is decreased until that velocity is zero and the solids then fall in the disengager. Some of the solids, by virtue of their lateral displacement, fall onto the top of transverse plate 48. Some of the solids fall past the inner surface 49 of baffle plate 48 onto the upper surface of baffle plate 46. A final portion of the solids fall past the inner surface 47 of baffle plate 46 into the bottom of disengager 14. The solids which fall onto the baffle plate 48 pass through the apertures 50 therein onto the baffle plate 46. Solids are removed from above baffle plate 46 through conduit 52 and into the bottom of disengager 14. Auxiliary gas upon striking the under surface of baffle plate 46 passes underneath the baffle plate 46 and into the conduit 54 for removal from disengager 14. Lifting gas passes upwardly around the baffle plate 31 and is removed from disengager 14 through outlet 55. Granular solids are removed from the bottom of disengager 14 through line 56.

In operation as above described the effect of the auxiliary gas stream in rising through the space between the outlets 43 and the under surface of baffle plate 46, is to cause the lifting gas and solids discharged from lift conduit outlet 30 to move laterally toward side wall 33 more rapidly and to a greater degree than they would in the absence of the auxiliary gas. Accordingly, the solids are inhibited or prevented from falling directly downwardly, after they have decreased in upward velocity to zero, onto the solids rising from beneath. By preventing the falling solids from striking to an excessive degree the solids rising from beneath, attrition of the solids is minimized. Also when as illustrated in Figure 2, transverse plates are employed in the expansion space, which plates are adapted to temporarily arrest the fall of granular solids, the use of auxiliary gas according to the invention is further advantageous in that it enables a greater proportion of the falling solids to be collected temporarily on the upper surfaces of the transverse baffles. The greater lateral displacement of the solids toward the transverse baffles results in more solids being collected above the baffles relative to the amount of solids which passes beneath the lowermost baffle and falls directly into the bottom of the disengager. This is advantageous since the attrition of granular solids is generally less when the solids fall in a series of stages from the top of their height of rise to the bottom of the disengager with temporary arresting of the fall of solids between stages, than when the solids fall directly from the top of their height of rise to the bottom of the disengager. It is to be understood that operation according to the invention can be advantageously achieved with the use of only one transverse baffle such as the baffle 46 in the disengager. The apparatus and operation described in connection with the drawing is presented merely as one advantageous embodiment of the invention. It is to be understood also that additional transverse baffles above the baffle 46 could be employed.

The disengager illustrated in the top drawing has a horizontal cross section with the shape of a trapezoid. This shape is particularly well adapted to the type of operation wherin a plurality of disengaging chambers are used, each chamber having the cross sectional shape of the disengager shown in the drawing. In copending application, Serial No. 203,323, filed December 29, 1950, by Clarence H. Thayer, now Patent No. 2,674,498, issued April 6, 1954, apparatus is disclosed and claimed of the type above referred to.

It is to be understood that the present invention can also be applied to the operation of apparatus wherein the lift conduit is centrally disposed with regard to the disengaging vessel rather than being adjacent to one or more side walls of the disengaging vessel as illustrated in the attached drawing. For example, where a cylindrical lift conduit is disposed centrally with regard to the cylindrical disengaging vessel an auxiliary gas conduit and inclined outlets therefrom can be employed which extend around the entire lift conduit rather than around merely a portion of the lift conduit as shown in the attached drawing. Also in such case the transverse baffles secured to the side wall of the disengager can extend entirely around the lift conduit.

The present invention is generally applicable to the elevation of granular solids and is particularly advantageous as applied to mixtures of granular solids a major proportion of which are coarse granular solids which are too large to pass through a 20 mesh U. S. Sieve Series screen. When such mixtures of granular solids are elevated through elongated confined zones, for example through lift conduits whose vertical height is 50 to 300 times the major dimension of the average cross section of the lift conduit it is necessary to impart to the solids a high velocity and the high velocity of the solids as they issue from the top of the lift conduit causes them to rise substantially vertically upwardly in the disengager with only a slight degree of lateral movement unless measures are taken, such as the method employed according to the present invention, in order to cause the solids to move laterally to a greater degree. Thus when the present invention is used in connection with operations wherein such mixtures of coarse solids are elevated through elongated confined zones, the invention provides means for reducing the attrition which would otherwise be disadvantageously high because of the tendency of the solids to fall directly downwardly onto the solids rising from beneath.

The invention is applicable to granular solids generally regardless of their composition. The granular solids which are elevated can be, for example, catalytic materials such as those which are widely used in hydrocarbon conversion processes or they can be, for example, inert heat transfer contact material such as is also used in known catalytic hydrocarbon conversion processes. Granular solids having other composition can also be elevated and separated from lifting gas according to the present invention.

Any suitable lifting gas can be employed. The lifting gas can be, for example, inert to the solids which are elevated. Examples of this type of lifting gas are air, steam, and flue gas as employed in the elevation of hydrocarbon conversion-supporting granular solids. The lifting gas can also be, for example, a material which is capable of undergoing conversion upon contact with the granular solids which are elevated. An example of this type of conversion gas is hydrocarbon vapor as employed in the elevation at conversion supporting temperatures, of hydrocarbon conversion-supporting granular solids. The auxiliary gas employed can be any suitable gas. It can have similar composition to the lifting gas employed or it can have a different composition.

According to the present invention the auxiliary gas stream employed has at the time of its discharge from the auxiliary gas conduit, a velocity which is greater than the velocity of the lifting gas at the time of its discharge from the lift conduit outlet. These velocities, as contemplated here, are linear velocities which can be calculated by dividing the volume rate of flow of the gas through the lift conduit, and the auxiliary gas conduit, by the cross sectional area of the lift conduit outlet and the cross sectional area of the auxiliary gas conduit outlet respectively. The point of discharge of auxiliary gas from the outlet of the auxiliary gas conduit is preferably close enough to the point of discharge of lifting gas from the lift conduit outlet so that the distance between the two points of discharge is not substantially greater than five times the major dimension of the cross section of the lift conduit outlet. The distance is preferably not greater than this, otherwise the effect of the auxiliary gas stream on the lifting gas stream may be diminished to a disadvantageous degree. A preferred embodiment of the invention is one in which the auxiliary gas discharge is itself close enough to the lift conduit outlet that the distance between them is less than the major dimension of the cross section of the lift conduit outlet, the auxiliary gas stream being inclined, however, at an angle with the vertical within the approximate range of 20° to 60°, so that sufficient distance between the rising stream of gas and solids and the auxiliary gas stream is provided in a substantial portion of the distance of rise of the auxiliary gas stream. The use of such an inclined auxiliary gas stream is advantageous in that it facilitates the removal of auxiliary gas from a disengager separately from lifting gas.

The point at which auxiliary gas is discharged into the disengager is preferably at the same approximate vertical level in the disengager as the lift conduit outlet. Also it is preferred that the outlet of the auxiliary gas conduit should extend substantially entirely around that portion of the lift conduit outlet which communicates with the expansion space provided within the disengager. In this way an advantageously high degree of uniformity of the effect of the auxiliary gas stream is obtained.

Although in the accompanying drawing, the lifting gas outlet is shown at the top of the disengager, it is to be understood that the lifting gas outlet or outlets can be at the side of the disengager adjacent and above the transverse baffles such as the baffles 46 and 48. Such positioning of lifting gas outlets is disclosed and claimed in my copending application, Serial No. 232,282, filed June 19, 1951, now Patent No. 2,684,270, issued July 20, 1954.

In the accompanying drawing, the apertures 50 and 51 and the conduit 52 are shown as means for removing granular solids from above the baffles 46 and 48. The conduit 52 is employed in order to convey solids down from above baffle 46 to a low enough level so that the auxiliary gas stream beneath baffle 46 does not interfere with the downward flow of solids. Any other suitable means can be employed for removing granular solids from above the transverse baffles. For example, the solids can pass through ports in the disengager side wall above the baffles and through conduits communicating with the ports, and can then be subsequently re-commingled, exteriorly of the disengager, with the other solids collected in other portions of the disengager.

In the accompanying drawing, a plurality of inclined outlets from an annular auxiliary gas conduit are shown, the outlets being numerous enough and close enough to each other so that the auxiliary gas streams discharged therefrom commingle shortly after discharge to provide a substantially continuous auxiliary gas stream extending around that portion of the lift conduit which faces toward the space provided in the disengager for substantial lateral expansion of lifting gas. A single continuous arc shaped slot could be provided as an outlet instead of the plurality of apertures, or any other suitable arrangement providing an inclined upwardly directed auxiliary gas stream could be used.

The invention claimed is:
1. In apparatus for elevating granular solids by means of a lifting gas through a lift conduit and upwardly into a disengaging vessel providing therein a space directly above the top of the lift conduit and providing, communicating with at least a portion of the periphery of said space, an expansion space for lateral expansion of lifting gas, the improvement which comprises: secured to a side wall of said vessel, a transverse baffle within said expansion space and vertically spaced a substantial distance above the top of said lift conduit and a substantial distance below the top of said expansion space; an auxiliary gas conduit having within said vessel an upwardly directed outlet adjacent the top of said lift conduit and inclined away from said space directly above the top of the lift conduit and directed toward the under surface of said baffle, said gas conduit and said outlet being outside said space directly above the top of the lift conduit; said vessel having an outlet therefrom for auxiliary gas beneath said baffle; and a separate outlet for lifting gas; and means for withdrawing solids from above said baffle to the exterior of said disengaging vessel substantially separately from lifting gas and auxiliary gas.

2. Method for separating granular solids from lifting gas, after passing lifting gas and granular solids upwardly through a confined zone as a stream of gas having solids suspended therein, which comprises: discharging solids and gas from said confined zone into an expansion zone; passing discharged solids and gas upwardly through said expansion zone as a rising stream; discharging separately introduced auxiliary gas upwardly from a point adjacent a lower portion of said rising stream, into said expansion zone and away from said rising stream as an inclined stream having linear gas velocity at discharge sufficiently great to produce substantial deflection of solids in said rising stream toward said auxiliary gas; reversing direction of movement of solids in said expansion zone; passing auxiliary gas upwardly a substantial distance through a zone providing free space for gaseous communication between said inclined stream and said rising stream; removing auxiliary gas from said expansion zone substantially separately from lifting gas; and removing solids from said expansion zone substantially separately from lifting gas and auxiliary gas.

References Cited in the file of this patent

UNITED STATES PATENTS

| 688,693 | Richter | Dec. 10, 1901 |
| 1,391,744 | Lower | Sept. 27, 1921 |
| 2,246,349 | Crum | June 17, 1941 |
| 2,358,497 | Egloff | Sept. 19, 1944 |
| 2,509,984 | Morrow | May 30, 1950 |
| 2,628,188 | Kirkbride | Feb. 10, 1953 |

FOREIGN PATENTS

| 278,858 | Germany | July 18, 1913 |
| 313,613 | Germany | Aug. 24, 1916 |